United States Patent [19]

Malaker et al.

[11] Patent Number: 4,626,141
[45] Date of Patent: Dec. 2, 1986

[54] CHIP CONTROL INSERT

[75] Inventors: John Malaker, Warren; Thomas J. Bernadic, Ferndale, both of Mich.

[73] Assignee: GTE Valeron Corporation, Danvers, Mass.

[21] Appl. No.: 694,034

[22] Filed: Jan. 23, 1985

[51] Int. Cl.[4] .............................................. B26D 1/00
[52] U.S. Cl. .................................................... 407/114
[58] Field of Search ................................. 407/114, 113

[56] References Cited

U.S. PATENT DOCUMENTS

| 3,187,406 | 6/1965 | Franko | 407/114 |
| 3,395,434 | 8/1968 | Wirfelt | 407/114 |
| 3,792,515 | 2/1974 | Lundgren | 407/113 |
| 3,973,307 | 8/1976 | McCreery et al. | 407/114 |
| 4,044,439 | 8/1977 | Romagnolo | 407/114 |
| 4,189,265 | 2/1980 | Arnold et al. | 407/114 |

Primary Examiner—Leonidas Vlachos
Attorney, Agent, or Firm—Lloyd M. Forster

[57] ABSTRACT

Chip control insert characterized by a chip control groove extending across polygon insert corners and along edge extending from corners with increasing width away from the cutting corner. The groove is formed with a radius extending below a narrow positive rake cutting edge land to a maximum depth tangent with the bottom of the groove.

6 Claims, 5 Drawing Figures

CHIP CONTROL INSERT

BACKGROUND OF THE INVENTION

Chip control inserts are known in the art where a groove on the face of the insert adjacent the cutting edge terminates in a ramp shoulder in the flow path of the chip serving to curl and/or break the chip. It is also known in the art to provide a positive rake cutting action serving to decrease power requirements either by tapering the sides extending to the cutting edge or providing a positive rake land on the face perimeter extending from the cutting edge. Special chip breaking effects have been achieved by providing a series of chip deflecting grooves or depressions spaced along the cutting edge such as disclosed in U.S. Pat. Nos. 4,215,957; 4,273,480; and 4,335,984.

Recess grooves or faces with chip breaking projections are also known in the art particularly for use in turning operations such as disclosed in U.S. Pat. No. 3,792,514 wherein a uniform concave groove is provided along each cutting edge of the insert for chip breaking in heavy cutting in combination with a nose projection in the concave groove isolated from an island on the insert serving for chip breaking in light cutting operations. Another form of such insert is disclosed in U.S. Pat. No. 4,214,845 including a pair of chip breaking projections at each corner with another projection on the bisector behind the first projections. While such insert has proved highly satisfactory in turning operations it has been found less effective in facing, boring and contouring operations where chips may pass the projections without contact.

BRIEF DESCRIPTION OF THE PRESENT INVENTION

The present insert has been found effective in producing satisfactory chip breaking in turning, facing, boring and contouring operations for both light and heavy cuts over a wide range of cutting speeds. A combination of constructional features include insert sides extending normal to reversible cutting faces of a diamond shaped configuration having rounded noses provided on both acute and obtuse cutting corners. A uniform narrow 4° positive land is provided all around the periphery followed by declining radius sloping to a full depth leading into a raised island form that extends further away from the cutting edge as it approaches the center line of the insert. On both the acute and obtuse corners the raised island form and terminates in a chip breaking slope extending perpendicular to the bisector of the angle. The same form is provided on both faces and can be finish pressed, as with sintered tungsten carbide powder, without grinding.

DESCRIPTION OF THE PREFERRED EMBODIMENT

Figure 1:
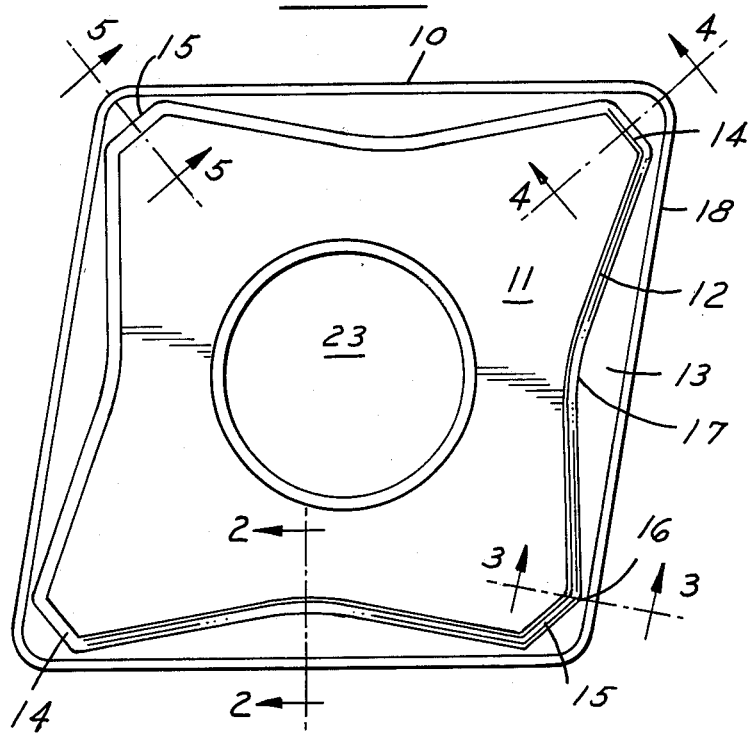
FIG. 1 is a plan view of a preferred embodiment of the insert.
Figure 2:
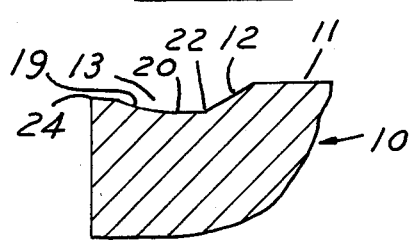
FIG. 2 is a fragmentary sectional view taken along the line 2—2 of FIG. 1.
Figure 3:
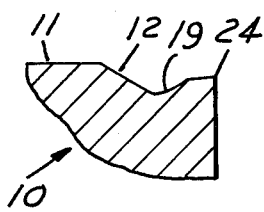
FIG. 3 is a fragmentary sectional view taken along the line 3—3 of FIG. 1.
Figure 4:
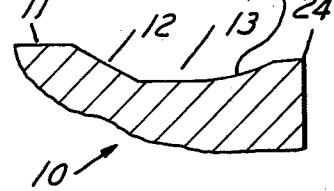
FIG. 4 is a fragmentary sectional view taken along the line 4—4 of FIG. 1.
Figure 5:
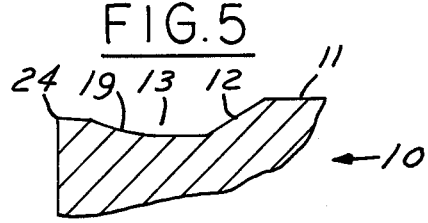
FIG. 5 is a fragmentary sectional view taken along the line 5—5 of FIG. 1.

With reference to FIG. 1 the configuration of an 80° diamond insert is shown which in a typical size may be ¾" I.C., 0.250" thick with 0.046" corner radius. Sides 10 are normal to the plane of cutting face shown which is identically provided on the opposite face of the insert. Continuous raised island 11 extends inwardly in a single plane from peripheral chip breaking ramp wall 12 extending from the base of recess 13 at an upward angle of 25° to 30°. Ramp wall 12 extends straight across the bisector of each acute corner as shown at 14 and obtuse corner as shown at 15 and departs from minimum spacing at 16 to a maximum spacing at 17 from cutting side edge 10.

Uniform positive rake narrow land 18, e.g. in the order of 0.010 wide, extends around the entire outer cutting edge periphery followed by radius 19 leading to tangency at the full depth with flat 20 having a variable width 21 extending to base 22 of ramp wall 12. Radius 19 in the typical size of inserts shown may be 0.200" centered approximately 0.060" from the insert side wall and extending to a maximum depth of 0.012" providing an arcuate clearance recess from the 4° positive rake chip flow path leading to chip breaking wall 12 spaced at a maximum distance of 0.070" from the side wall at the center 23 and at a minimum distance of 0.020" at a point 24 near the corner.

The progressive increasing distance of wall 12 from cutting edge 10 for deeper cut chips has been found to provide desired chip breaking performance over wide range of depths of cut and cutting speeds in typical, turning, facing, boring and contouring operations. In addition the corner walls 14 and 15 have been found to provide excellent chip breaking characteristics for light cuts associated with minimum cutting corner penetration into the workpiece surface.

The insert is provided with a central through hole 23 preferably engaged by lateral contact of a retention pin for holding the insert in an angularly shouldered pocket of a tool holder in accordance with conventional practice. Island 11 accordingly provides the uppermost surface for unobstructed chip flow with tip 24 of cutting edge extending slightly below such surface in the order of 0.005", providing protective clearance relative to the pocket surface for the inactive cutting edge of the insert.

We claim:

1. Chip control insert comprising polygon side cutting edge periphery, planar island face bounded by ramp chip breaking wall, said wall extending across each cutting corner, said wall extending adjacent said edge away from each corner with progressively increasing spacing from said edge, narrow uniform rake land around said periphery followed by groove leading to base of said chip breaking wall, said groove being formed with an arcuate concave surface formed with a uniform radius descending from said land to a maximum depth tangent to a flat bottom, said flat bottom leading to an obtuse angular juncture with said chip breaking wall.

2. The insert of claim 1 wherein said land extends at approximately 4° positive rake angle to the face plane and said chip breaking wall extends at a single uniform ramp angle.

3. The insert of claim 1 wherein said cutting edge periphery has a diamond shaped configuration.

4. The insert of claim 1 wherein said cutting edge periphery had a diamond shaped configuration with opposed 80° and 100° angles.

5. The insert of claim 1 formed with double face reversible and indexable cutting edges, the side walls of said insert extending normal to the planar island faces.

6. The insert of claims 1 or 2–5 formed with dimensions approximately proportional to a typical example having ¾" I. C., 0.250" thick, 0.046" corner radius, 0.010" wide land, 0.200" radius groove centered 0.060" from insert side wall extending to a maximum depth of 0.012" with a ramp angle of approximately 25° to 30° starting at a base point spaced at a maximum center distance of 0.070" from the side wall at the center and at a minimum distance of 0.020" near the corner.

* * * * *